(12) United States Patent
Chou et al.

(10) Patent No.: US 7,310,359 B2
(45) Date of Patent: Dec. 18, 2007

(54) THERMALLY SELF-CORRECTING GAIN MODULES AND ASSOCIATED SYSTEMS AND METHODS

(75) Inventors: Hsian P. Chou, Winchester, MA (US); Yu-Lin Wang, Andover, MA (US)

(73) Assignee: Textron Systems Corporation, Wilmington, MA (US)

( * ) Notice: Subject to any disclaimer, the term of this patent is extended or adjusted under 35 U.S.C. 154(b) by 250 days.

(21) Appl. No.: 11/000,632

(22) Filed: Dec. 1, 2004

(65) Prior Publication Data

US 2006/0114951 A1 Jun. 1, 2006

(51) Int. Cl.
*H01S 3/04* (2006.01)

(52) U.S. Cl. .......................................... 372/33; 372/36

(58) Field of Classification Search .............. 372/33, 372/36

See application file for complete search history.

(56) References Cited

U.S. PATENT DOCUMENTS

| | | | |
|---|---|---|---|
| 5,386,427 A * | 1/1995 | Zayhowski | 372/34 |
| 6,101,201 A | 8/2000 | Hargis et al. | |
| 6,344,920 B1 * | 2/2002 | Fukumoto | 359/330 |
| 6,385,220 B1 | 5/2002 | Miller et al. | |
| 6,646,777 B2 * | 11/2003 | Qin et al. | 359/281 |
| 6,667,999 B2 * | 12/2003 | Hasson et al. | 372/36 |
| 2002/0172253 A1 * | 11/2002 | Vetrovec | 372/95 |
| 2003/0063638 A1 * | 4/2003 | Hasson et al. | 372/36 |

OTHER PUBLICATIONS

H.P. Chou, Y. Wang, V. Hasson, "Compact and efficient DPSS laser using diamond-cooled technology," Proc. of SPIE Conf. for HPLA V, vol. 5448, p. 550-560, (Apr. 25, 2004).
Kemp A J et al, "Progress Towards High-Power, High-Brightness Neodymium-Based Thin-Disk Lasers," Progress in Quantum Electronics, Pergamon Press (Oxford, GB), vol. 28 (No. 6), 2004, p. 305-344, paragraph 3.2.2 figures 7, 9.

* cited by examiner

*Primary Examiner*—Minsun Oh Harvey
*Assistant Examiner*—Delma R. Flores Ruiz
(74) *Attorney, Agent, or Firm*—BainwoodHuang (57) ABSTRACT

Aspects of the present invention are directed to the use of optical gain structures that include alternating layers of gain medium and transparent heat conductors in which the gain medium itself functions as a correction optic. The gain medium changes to an optimum or desired shape because of the thermal changes occurring as the materials of the optical gain structure(s) reach a desired optical output condition. At the desired optical output conditions, the gain medium conforms to a desired shape. The desired shape may be, for example, that of an optical surface of a transparent heat conductor. By designing the initial shape of the gain medium such that the physical contact with the transparent heat conductor is maximized at the desired optical output conditions, conductive heat transfer between the gain medium and heat conductor(s) is maximized at the desired optical output condition.

17 Claims, 10 Drawing Sheets

THERMALLY SELF-CORRECTING GAIN MODULES AND ASSOCIATED SYSTEMS AND METHODS

BACKGROUND

Coherent light has many useful qualities and applications. Lasers are the most common sources of coherent light, and are utilized in many industries. For example, lasers are used in industrial manufacturing for various processes including cutting, machining and welding of metallic and non-metallic materials. Lasers are also used in the telecommunications industry to generate and amplify light transmitted over optical fibers, and also in many other applications.

Certain wavelengths of light can be difficult to produce directly from lasers. This may be due to material properties, e.g., energies of the light producing electron transitions, or complexities involved with managing a particular gain medium, e.g., toxicity of gases or liquids that are used. Coherent light may be produced at these otherwise problematic wavelengths by using optical parametric devices to shift the wavelength of the output of a laser. Optical parametric devices convert light of one wavelength to light of another wavelength through the process known as three-wave interaction, in which three optical waves or fields are mixed and one or two of the three optical waves may be selectively amplified. Nonlinear crystalline materials are commonly characterized as being a particular type, i.e., either Type I or Type II, according to how the effect of double refraction or birefringence affects incident light once it enters the particular crystal. A nonlinear crystal may be referred to as a Type I crystal when an incident or "pump" wave is doubly refracted into signal and idler fields or waves that have the same polarization, which is orthogonal to the pump wave. A Type II nonlinear crystal is one producing orthogonally polarized signal and idler fields or waves from a pump wave.

Efficient heat removal from an active or nonlinear gain medium is a key issue for any high power operation, and can constrain output power scaling for a given gain medium. Excess heat, or thermal energy, within a gain medium can decrease the desired gain interaction, whether it be laser or parametric. Deleterious consequences of excessive heat in the gain medium include a reduced population inversion and thermal lensing. Thermal management issues are especially important for solid-state lasers, where, unlike gas and liquid active medium lasers, the active medium itself cannot be removed from the laser cavity to facilitate proper heat exchange.

Previous attempts have been made to improve thermal management in solid state lasers to increase power output and/or beam quality. Convective cooling has been used to remove heat from solid state gain media by having a fluid, which may be either a gas or liquid, flow over one or more surfaces of the gain particular medium. Conductive cooling methods have been used to remove heat from one or more surfaces of a solid state gain medium, typically by placing a heat sink into contact with one or more surfaces of the gain medium. Such previous convective and conductive cooling methods can be limited as to the amount of heat that can be removed from the gain medium. Because solid state gain media are typically poor heat conductors and conductors, the rate at which heat can be removed from the gain medium can be limited by the gain medium surface area that is available for heat removal.

Figure 1:
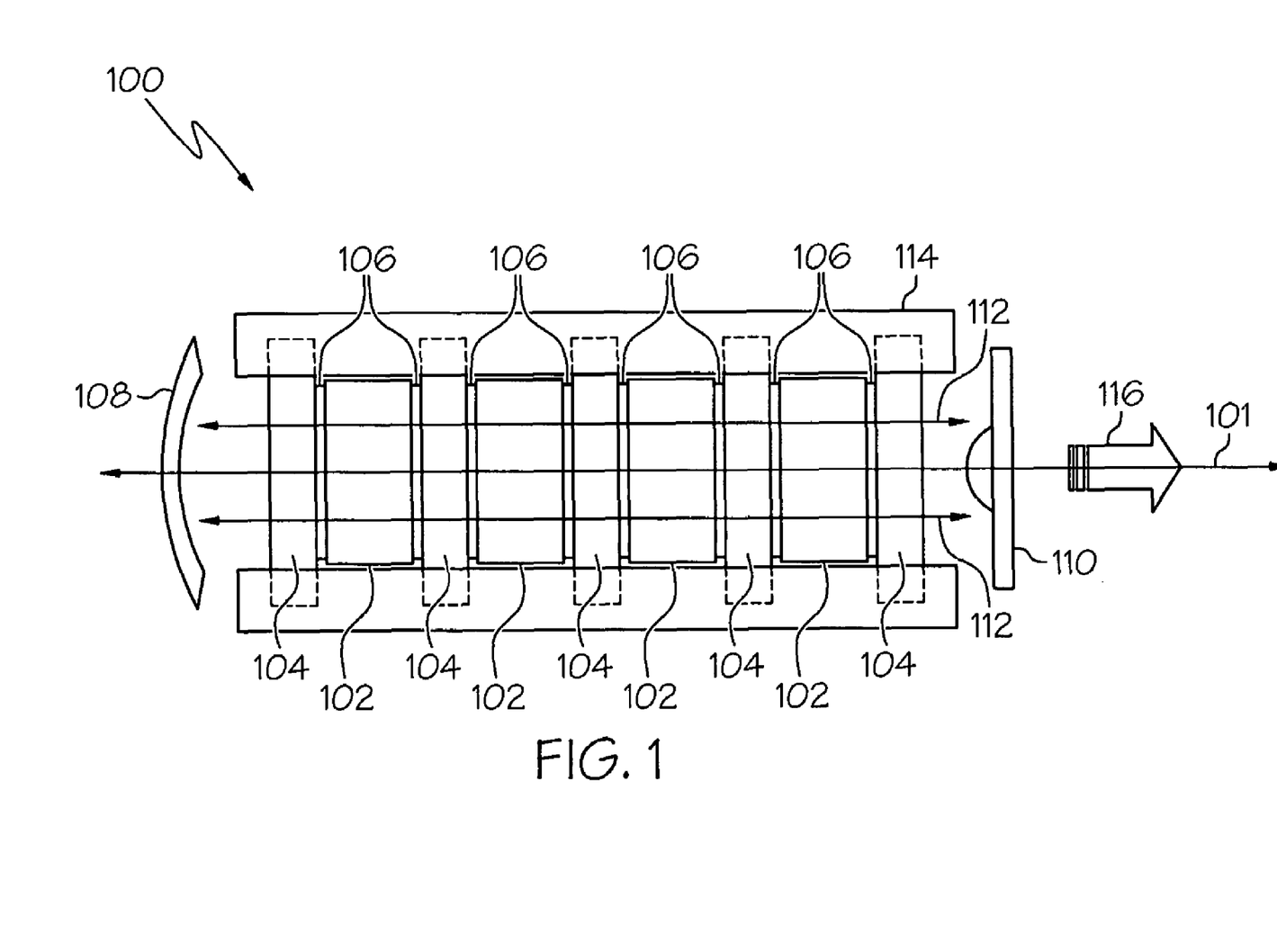
FIG. 1 is a side cross-sectional view of a prior art laser.

A prior art laser in which a given volume of gain medium is separated into pieces as a way to increase the surface area available for heat transfer is described in U.S. Pat. No. 6,667,999 to Hasson et al., commonly owned by the assignee of the present application. FIG. 1 is a cross section of a prior art laser 100 as described in U.S. Pat. No. 6,667,999. The prior art laser 100 includes multiple gain cells configured in a sandwich-like arrangement along an optical axis 101 within a resonator formed by first and second mirrors 108, 110. Each gain cell consists of a disk of laser material 102, such as Nd:YAG, alternating with a disk of an optically transparent heat transfer medium (inline OTH) 104. The inline OTH 104 is described as a diamond disk. Antireflective or index matching coatings 106 are present between the disks of laser material 102 and the adjacent inline OTH 104. A peripheral OTH 114 is positioned laterally to the gain cells and in contact with a peripheral surface of the inline OTH. The peripheral OTH 114 contacts each gain cell so that heat can be transferred to a heat exchange system (not shown). When the gain cells are optically pumped to create laser gain and an optical output 116, waste heat develops in the laser gain material 102. This heat is conducted parallel to the axial direction into the inline OTH 104, e.g., diamond disks, where the heat is efficiently conducted radially by the diamond 104 to the peripheral OTH and on to the heat exchange system (not shown). A similar laser and thermal management system is described in H. P Chou, Y. Wang, V. Hasson, "Compact and Efficient DPSS Laser Using Diamond-cooled Technology", Proc. of SPIE Conf. For HPLA V, Vol. 5448, p 550, Taos, N.Mex., April 2004.

Figure 2A:
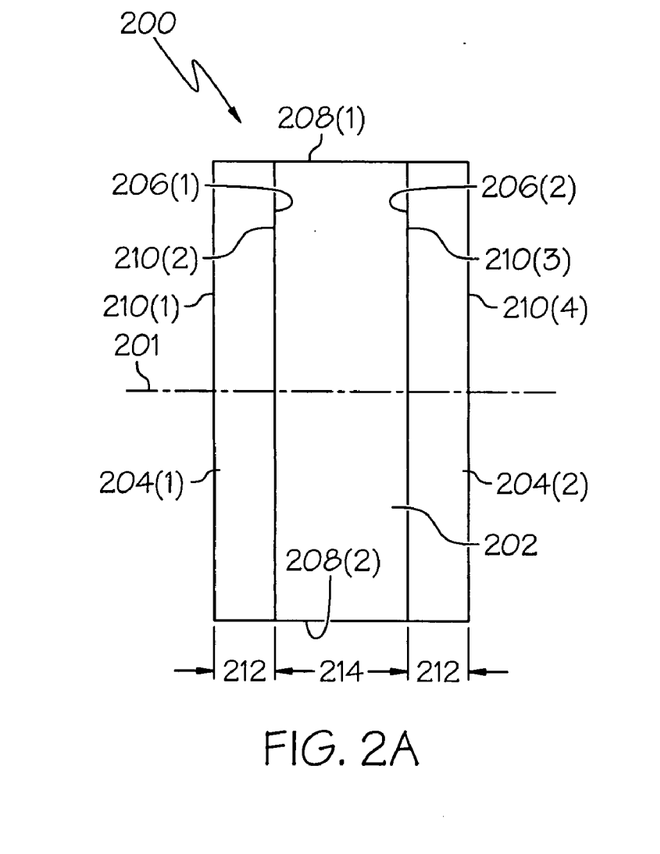
Figure 2B:
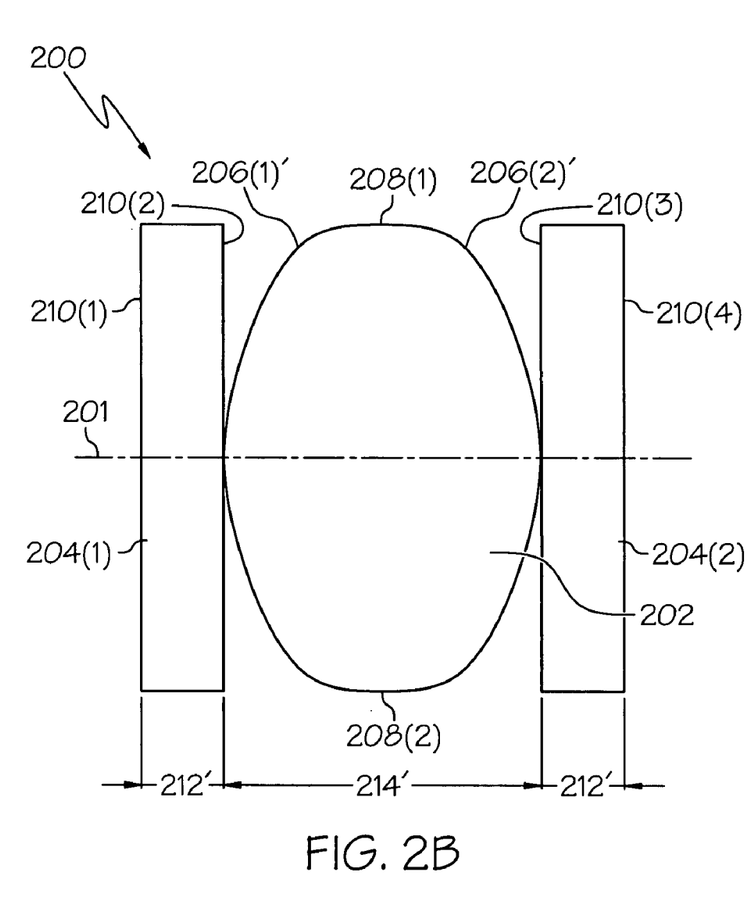

Even though the laser 100 of FIG. 1 improves on previous techniques to remove heat from a laser gain medium, it has been observed that when pump power is increased above a certain value, the specific output for a given gain medium decreases. FIG. 2 includes FIG. 2A and FIG. 2B, which depict, respectively, a gain module 200 of the thermal management system 100 of the prior art laser of FIG. 1 at two different operational conditions. The gain module 200 includes a gain medium 202 placed between two inline OTH 204(1)-204(2) along an optical axis 201 of a resonator (not shown). The gain medium 202 is disk shaped and has first and second optical surfaces 206(1)-(2), first and second lateral sides 208(1)-(2), and a width or thickness 214. The two inline OTH 204(1)-(2) are also disk-shaped and each have first and second optical surfaces 210(1)-(4), as well as a desired thickness 212. The operational condition depicted in FIG. 2A represents a condition in which no optical pumping is present and consequently no optical output is being produced by the gain medium 202. As shown in FIG. 2A, the first and second optical surfaces 206(1)-(2) of the gain medium 202 are each initially in contact with a respective first optical surface 210(2)-(3) of the adjacent OTH 204(1)-(2).

The operational condition depicted in FIG. 2B represents one in which the gain medium 202 is producing an optical output exceeding a certain specific output value along the optical axis 201 due to incident optical pump energy of a relatively high power density. The heat generated through the optical gain process produces non-uniform thermal expansion of the gain medium 202 as the specific output of the gain medium 202 exceeds a certain value. The OTH 204(1)-(2) do not deform significantly because diamond has a very high thermal conductivity, i.e., the highest of any known substance at room temperature, as indicated by thickness 212', which is only marginally greater than the initial thickness 212. The OTH 204(1)-(2) can consequently conduct the heat flux with a relatively low thermal gradient in the radial direction relative to the optical axis 201.

Because the laser gain material 202 has a much lower thermal conductivity than the OTH, larger temperature gradients occur.

With continued reference to FIG. 2B, the temperature gradients within the gain medium 202 resulting from the optical gain process produce non-uniform expansion of the gain medium 202 in the direction of the optical axis 201. This can lead to warping of the optical surfaces 206(1)'-(2)' as indicated by the increased thickness 214' of the gain medium 202. The thermal expansion 214' reaches a maximum value along the optical axis 201, as shown. Significant internal stresses may develop in the gain medium 202 if the physical movement of the OTH 204(1)-(2) and gain medium 204 are constrained relative to each other as the thermal expansion process occurs. The stresses can eventually lead to fracture of the gain material 202. The nature of the non-uniform thermal distortion is such to form the material of the initially disk-shaped gain medium into a biconvex, lens-like shape, as shown. The thermal expansion can also cause separation of the gain medium 202 and the OTH 204(1)-(2) at their interface, as shown in FIG. 2B. Separation of the gain medium 202 from the diamond OTH leads to reduced beam quality and reduced specific output for the gain medium 202, even as pump energies increase beyond a certain value.

What is desirable, therefore, is to provide apparatus, systems, and methods for thermal management that allow laser and/or parametric gain media to operate above present limits of specific output for a given solid state gain medium.

SUMMARY

Aspects of the present invention are directed to the use of optical gain structures that include alternating layers of gain medium and transparent heat conductors in which the gain medium itself functions as a correction optic. The gain medium changes to an optimum or desired shape because of the thermal changes occurring as the materials of the optical gain structure(s) reach a desired optical output condition. At the desired optical output conditions, the gain medium conforms to a desired shape, which may be, for example, that of an optical surface of a transparent heat conductor. By designing the initial shape of the gain medium such that the physical contact with the transparent heat conductor is maximized at the desired optical output conditions, conductive heat transfer between the gain medium and heat conductor(s) is maximized at the desired optical output condition. Consequently, material stresses may be minimized and output beam quality may be maximized for high specific outputs of the gain medium. Embodiments of the present invention are directed to apparatus, systems, and methods providing for thermally self-correcting laser and optical parametric systems.

One embodiment of the present invention includes a thermally self-correcting optical gain module having a first heat conductor substantially transparent to one or more desired wavelengths of light. The first heat conductor has a first coefficient of thermal expansion, a first coefficient or thermal conductivity, and first and second optical surfaces. A first gain medium operable to produce light at one or more desired wavelength and having first and second optical surfaces is disposed adjacent to the first heat conductor. The first gain medium has a second coefficient of thermal expansion greater than the first coefficient of thermal expansion. The first gain medium has a second coefficient of thermal conductivity lesser than the first coefficient of thermal conductivity. The first gain medium is operable to receive pump energy from a means for pumping. The first optical surface of the first gain medium has a predetermined shape at a first optical output condition. The first optical surface of the first gain medium is substantially dissimilar to the first optical surface of the first heat conductor at the first optical output condition. The first optical surface of the first gain medium substantially conforms to and contacts the first optical surface of the first heat conductor at a second optical output condition. Heat conduction can occur from the first gain medium to the first heat conductor through an interface formed by the first optical surface of the first heat conductor and the first optical surface of the first gain medium at the second pumping condition.

The gain medium can be a laser gain material. The gain medium may include YAG, and may be Nd:YAG. The gain medium can be include a nonlinear gain medium. The nonlinear gain medium may include KTA. The first optical surface of the first heat conductor may be substantially circular. The first gain medium may be shaped as a disk. The first optical surface of the first gain medium may be concave toward the first optical surface of the first heat conductor. The first optical surface of the first gain medium may have a substantially Gaussian or Hermite-Gaussian profile relative to the optical axis. The first optical surface may have a Gaussian profile relative to the optical axis. The first transparent heat conductor may be shaped as a disk that is concentric, or axisymmetric, with the optical axis.

The gain module may include a second gain medium disposed on the optical axis and adjacent to the second optical surface of the first heat conductor. The second gain medium when present is operable to produce light at one or more desired wavelengths and has first and second optical surfaces. The second gain medium has the second coefficient of thermal expansion, and is operable to receive pump energy from a means for pumping. The first optical surface of the second gain medium has a predetermined shape at a first optical output condition. The predetermined shape is substantially dissimilar to the second optical surface of the first heat conductor at the first optical output condition. The first optical surface of the second gain medium substantially conforms to and contacts the second optical surface of the first heat conductor at a second optical output condition. Heat conduction can occur from the second gain medium to the first heat conductor through an interface formed by the second optical surface of the first heat conductor and the first optical surface of the second gain medium at the second optical output condition. The gain module may include a second heat conductor disposed adjacent to the first gain medium on the optical axis. The second heat conductor is substantially transparent to one or more desired wavelengths of light. The second heat conductor has the first coefficient of thermal expansion, the second coefficient of thermal conductivity, and first and second optical surfaces. The first optical surface of the second heat conductor is disposed adjacent to the second optical surface of the first gain medium.

The first transparent heat conductor may include diamond, which may be single crystal diamond. The first transparent heat conductor may include sapphire. The gain module may include one or more anti-reflective or index matching coatings disposed between the first optical surface of the first gain medium and the first optical surface of the first heat conductor. The one or more anti-reflective or index matching coatings have refractive indexes between a refractive index of the first gain medium and the first heat conductor. Suitable AR and/or index matching coatings may be deposited by know deposition techniques, e.g., sputtering, and may be of desired thickness, e.g., multiples of quarter-wavelengths of light produced by an associated gain medium. Such coatings may include one or more layers of aluminum oxide (alumina, or $Al_2O_3$), tantalum pentoxide ($Ta_2O_5$), magnesium fluoride ($MgFl_2$), silicon dioxide ($SiO_2$), titanium oxide (TiO), or combinations thereof, in certain embodiments.

A further embodiment includes a thermally self-correcting optical resonator system. The system has a first mirror having a first reflecting surface with a first reflectivity at a desired wavelength and a second mirror having a first reflecting surface with a second reflectivity at the desired wavelength. The second reflectivity is different from the first reflectivity. The first reflecting surface of the second mirror is configured and arranged to reflect light along an optical axis to the first reflecting surface of the first mirror. The first and second mirrors are operable as a resonator. A first heat conductor disposed on the optical axis. The first heat conductor is substantially transparent to one or more desired wavelengths of light. The first heat conductor has a first coefficient of thermal expansion, a first coefficient of thermal conductivity, and first and second optical surfaces. The system includes a first gain medium operable to produce light at one or more desired wavelengths and having first and second optical surfaces. The first gain medium is disposed adjacent to the first heat conductor on the optical axis. The first gain medium has a second coefficient of thermal expansion greater than said first coefficient of thermal expansion. The first gain medium has a second coefficient of thermal conductivity lesser than the first coefficient or thermal conductivity. The first gain medium is operable to receive pump energy from a means for pumping. The first optical surface of the first gain medium has a predetermined shape at a first optical output condition corresponding to no pump energy. The predetermined shape is substantially dissimilar to the first optical surface of the first heat conductor at the first optical output condition. The first optical surface of the first gain medium substantially conforms to and contacts the first optical surface of the first heat conductor at a second optical output condition. Heat conduction can occur from the first gain medium to the first heat conductor through an interface formed by the first optical surface of the first heat conductor and the first optical surface of the first gain medium at the second optical output condition.

The thermally self-correcting optical resonator system may include a means for pumping operable to produce pump energy. The means for pumping is configured and arranged to transmit pump energy to the first gain medium. The resonator of the system can be a stable resonator or an unstable resonator. The means for pumping may include one or more diode bars. The first heat conductor may include diamond, which can be single crystal diamond. The means for pumping may be configured and arranged such that pump light is incident on the first transparent heat conductor at the Brewster angle between the first heat conductor and an intermediary optical medium located between the means for pumping and the first heat conductor. The intermediary optical medium can be air. The intermediary optical medium can be water. The system may include a beam combiner disposed on the optical path in the resonator to receive the pump energy from the means for pumping. When present, the beam combiner is configured and arranged to transmit the pump energy along the optical path. The beam combiner may include one or more Brewster prisms. The first mirror can be a graded reflectivity mirror. The graded reflectivity mirror may include one or more optical coating with graded reflectivity profiles disposed on the first optical surface of the first mirror, and the coatings may support a single transverse mode along the optical axis. The graded reflectivity mirror may include a Gaussian reflectivity profile. One or more dichroic coatings may be disposed on the first and second mirrors within the resonator. The dichroic coatings may transmit the pump wavelength and have a desired reflectivity for a wavelength generated by the first gain medium.

A further embodiment includes a method of producing light using a self-correcting gain medium in conjunction with a transparent heat conductor. A first gain medium having first and second optical surfaces, with the first optical surface having a thermally self-correcting shape, may be placed adjacent a heat conductor having first and second optical surfaces and being transparent at one or more desired optical wavelengths. The thermally self-correcting shape is dissimilar to the shape of the first optical surface of the heat conductor at an initial level of optical output of the first gain medium. Pump energy is added to the first gain medium. Thermal energy is added to the first gain medium by the associated gain process. The first gain medium produces a desired optical wavelength. The first optical surface of the first gain medium conforms to the first optical surface of the heat conductor at a desired level of optical output of the gain medium. Heat is removed axially from the first gain medium through the first optical surface of the heat conductor. Heat is removed radially from the heat conductor. The step of adding thermal energy to the first gain medium can be selected from the group consisting of amplifying fluorescence, amplifying a signal wave, amplifying an idler wave, and amplifying a pump wave.

BRIEF DESCRIPTION OF DRAWINGS

These and other features, aspects, and advantages of the present invention will become better understood with regard to the following description, appended claims, and accompanying drawings. The drawings are not necessarily to scale, emphasis instead being placed on illustration of principles of the invention. The drawings include the following figures:

FIG. 2 includes FIG. 2A and FIG. 2B, which depict side cross-sectional views of a gain cell from the laser of FIG. 1 at two different temperatures.

FIG. 4 includes FIG. 4A and FIG. 4B, which depict side cross-sectional views of an alternate illustrative embodiment of a gain module according to the present invention.

DETAILED DESCRIPTION

The present invention may be understood by the following detailed description, which should be read in conjunction with the attached drawings. The following detailed description of certain embodiments is by way of example only and is not meant to limit the scope of the present invention.

Aspects of the present invention are directed to the use of optical gain structures that include alternating layers of gain medium and transparent heat conductors in which the gain medium itself functions as a correction optic. The gain medium changes to an optimum or desired shape because of the thermal changes occurring as the materials of the optical gain structure(s) respond to desired pumping conditions. At the desired pumping conditions, the gain medium conforms to a desired shape, for example, an optical surface of an adjacent transparent heat conductor. By designing the desired shape of the gain medium such that the thermal contact with the transparent heat conductor is maximized at desired optical pumping and/or optical output conditions, material stresses may be minimized in the gain medium and output beam quality may be maximized for high specific outputs. Embodiments of the present invention are directed to apparatus, systems, and methods providing for thermally self-correcting laser and optical parametric systems.

Figure 3:
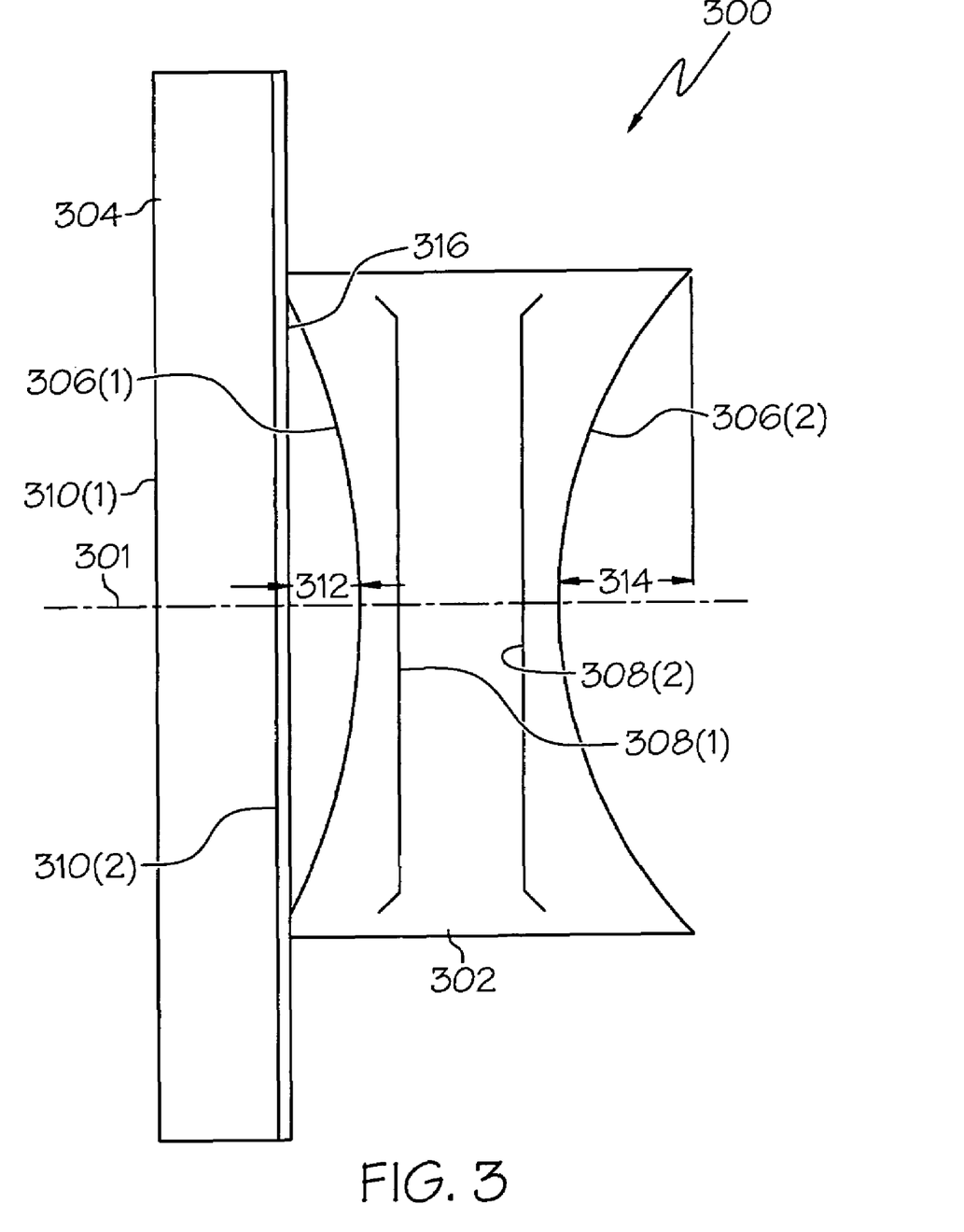
FIG. 3 is a side cross-sectional view of an illustrative gain module according to the present invention.

FIG. 3 is a side cross-sectional view of a gain module 300 according to the present invention. The gain module 300 includes a suitably formed gain medium 302 and a transparent heat conductor 304 adjacent to one another on an optical axis 301. The gain module 300 is shown in a condition representing a condition less than a desired specific output for the gain medium 302. The gain medium 302 has first and second optical surfaces 306(1)-(2) along the optical axis 301. The first and second optical surfaces 306(1)-(2) have respective predetermined shapes, e.g., profiles 308(1)-(2), described in greater detail hereinafter. The transparent heat conductor 304 has first and second optical surfaces 310(1)-(2). One optical surface 310(2) of the gain medium 302 is configured and arranged to receive light from the gain medium 302. The gain medium 302 may be optically pumped by a suitable means for pumping (not shown) and is operable to produce light at a desired wavelength through an optical gain process.

The profile of each optical surface of the gain medium is such that the optical surface conforms to any input surface of an adjacent transparent heat conductor at desired pumping conditions. The optical surface profiles 308(1)-(2) may be derived from detailed thermo-mechanical-optical calculations, described in more detail below. The result is a desired shape for the gain medium optical surfaces at desired specific output conditions at a design optical pumping load (kW/cm$^3$). The desired shape of the optical surfaces at the desired output conditions may be such as to maximize (i) surface contact with the adjacent optical face(s) of a transparent heat conductor 304, and (ii) maximize beam quality for an output beam produced by the gain medium 302. In some applications, the shape of gain media optical surfaces may have profiles 308(1)-(2) that are Gaussian or Hermite-Gaussian, to accommodate output beam intensity of the TEM$_{00}$ mode of an associated stable resonator or a deterministic profile from a unstable resonator, with or without a graded reflectivity output coupler, or mirror. In certain embodiments, the profiles 308(1)-(2) may be different from one another. For example, the degrees of concavity of each optical surface 306(1)-(2) may be different as illustrated by dissimilar respective distances 312 and 314 on the optical axis 301. These differences may depend on thermal conductivity values adjacent to the respective optical surfaces 306(1)-(2), such as when a transparent heat conductor is adjacent to only one side of the gain medium 302.

The materials used for the gain media 302 may be active or "laser" gain media or may be optical parametric gain media. Suitable types of laser gain media may include solid state media, including solid state gain media that have high power and thermal loading material properties. In certain embodiments, the gain medium 302 may include nonlinear, or birefringent, optical crystalline materials as parametric gain media. In preferred embodiments, the gain module 300 includes thin disks of Nd:YAG laser gain material alternated between thin disks of transparent heat conductors 304 made of single crystal synthetic diamond. Diamond's heat conductivity is over 2000 W/m° K and at room temperature its value is the highest of any known substance. Other materials may be used, for non-limiting example, sapphire, which has a heat conductivity of 40 W/m° K.

With continued reference to FIG. 3, one or more suitable antireflection (AR) or index matching coatings 316 may be present between the gain medium 302 and transparent heat conductor 304 on the optical axis 301. Such coatings 316 may be disposed on an optical surface 310 of the transparent heat conductor 304, as shown in FIG. 3, or an optical surface, e.g., 306(1) of the adjacent gain medium 302. In certain embodiments, suitable AR and/or index matching coatings may include one or more layers of aluminum oxide (alumina, or $Al_2O_3$), tantalum pentoxide ($Ta_2O_5$), and/or magnesium fluoride ($MgFl_2$) of desired thickness, e.g., quarter-wavelengths of light produced by an associated gain medium. Suitable AR and/or index matching coatings may include silicon dioxide ($SiO_2$) and/or titanium oxide (TiO), in certain embodiments.

In certain applications, the profiles of the gain medium 302 may be derived by performing mathematical analyses that involve a numerical procedure to solve coupled heat transfer and electromagnetic wave propagation equations at the interface of the gain medium-transparent heat conductor interface, e.g., diamond-YAG interface, under various laser pump powers. Self-consistent solutions for temperature profiles for each contact surface may be obtained by an iterative procedure in which solutions converge, for non-limiting example, by applying the Newton-Raphson method. Other suitable iterative methods may be used, including, but not limited to, the Chebyshev iteration method and other methods that use orthogonal polynomials. The solutions for temperature distributions in the various substances involved, e.g., diamond of the heat conductor 304, index matched coatings 316, a gain medium 302 including YAG, etc., can in turn provide refractive index profiles within each material, respectively. Solving the EM wave equation for light propagation in an inhomogeneous medium, whose refractive index profiles have been determined previously, leads to the solutions for reflective as well as transmitted waves at the interface between the gain medium and transparent heat conductor. These calculations may be carried out as a function of pump spatial power density conditions. Heat transfer characteristics and optical performance of any included AR coatings can be taken into account for such calculations.

The relevant physics may be modeled using suitable coupled-physics finite element modeling and analysis software. For example, ANSYS-MULTIPHYSICS or FEMLAB modeling software may be used for the thermo-mechanical and electromagnetic (EM) wave propagation calculations to determine a suitable initial shape of the optical surfaces of a gain medium under conditions of no pumping. Such software can be used to be model the coupled physics of a gain medium with a given initial shape under desired optical conditions (e.g., pumping, type of optical gain process, gain coefficient) subject to thermal boundary conditions that allow a desired specific output for the gain medium to be achieved.

In certain applications, the initial shape of the gain medium optical surfaces for non-pumped condition can be derived by using suitable software to take the final shape of the gain medium 302 at the desired operational conditions, subject that final shape to the thermal expansion occurring at the desired operational conditions, and then reverse the resulting shape. For example, assuming that at its desired operational condition the gain medium 302 is to conform to a disk-shaped diamond heat conductor 304, ANSYS-MULTIPHYSICS or FEMLAB modeling software may be used to model the thermal expansion that a disk of the same gain material undergoes at the desired operational conditions, e.g., desired specific output subject to the thermal boundary conditions presented by the heat conductors and EM wave conditions within an associated resonator. For a disk of gain material, such thermal boundary conditions may include (i) an insulated circumferential surface, and (ii) a heat flux, e.g., constant or linear, per unit area over the first and second optical surfaces to model the high heat conductivity of associated transparent heat conductors. By reversing, or flipping, the shapes of the thermally deformed optical surfaces of the modeled disk of gain medium relative to the optical axis, and using this reversed shape for the predetermined shape of the actual gain medium, the optical surfaces of the actual gain medium will be optimized to conform to the desired shape, e.g., a flat disk, at the desired operational conditions. The preceding is one way to determine the thermally-self-correcting shape of the gain medium, and other ways may be used. Other suitable software may be also be used, e.g., ZEMAX software for the EM wave propagation. ANSYS-MULTIPHYSICS is a trademark for engineering analysis software by ANSYS, Inc., of Southpointe, 275 Technology Drive, Canonsburg, Pa. 15317. FEMLAB is a registered trademark for engineering analysis software by COMSOL, Inc., 1 New England Executive Park Suite 350 Burlington, Mass. 01803. ZEMAX is a registered trademark for optical design software by ZEMAX Development Corporation, 4901 Morena Blvd. Suite 207, San Diego, Calif., 92117-7320 USA.

The desired shape of the optical surfaces 306(1)-(2) and associated profiles 308(1)-308(2) can be calculated, as expressed above. One can also improve the calculated result by obtaining measurements of the impact on the wave front of an optical beam passed through the gain module when being pumped 300. By doing such measurements at a sequence of pump power conditions, e.g., up to a certain amount of thermal expansion of the gain medium on the optical axis, the model of the profiles 308(1)-308(2) may be validated and anchored. In the interpretation of the data, one may distinguish between optical distortions due to thermal expansion and thermally induced changes in the refractive index of the gain material.

Figure 4A:
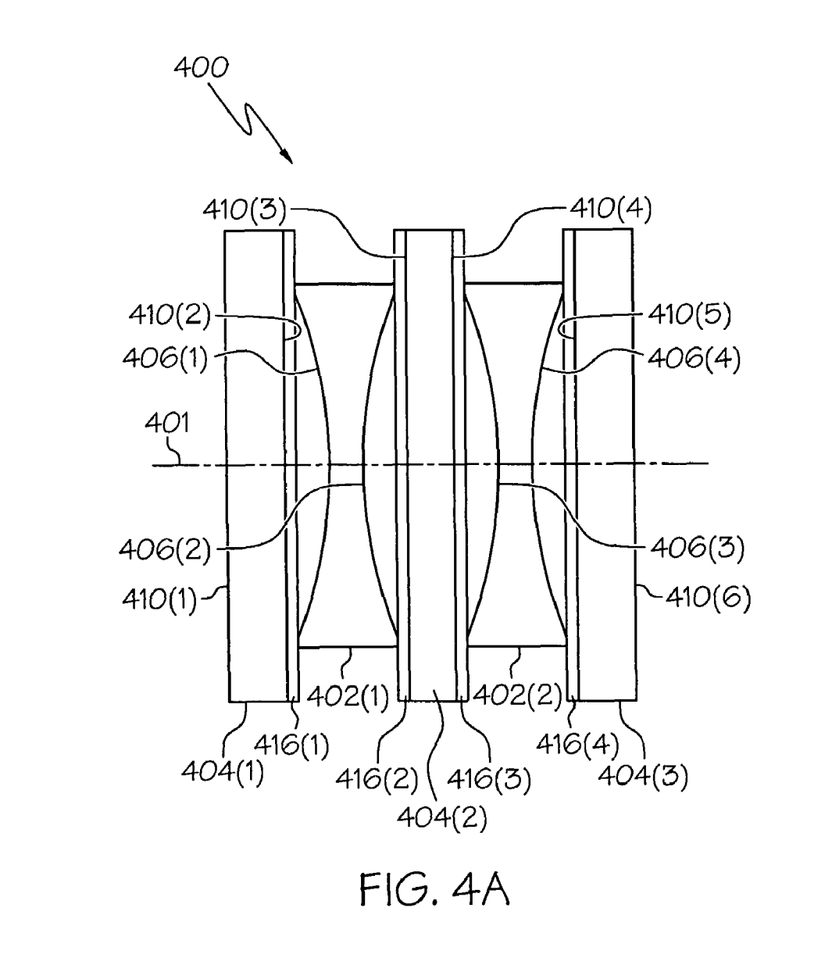
Figure 4B:
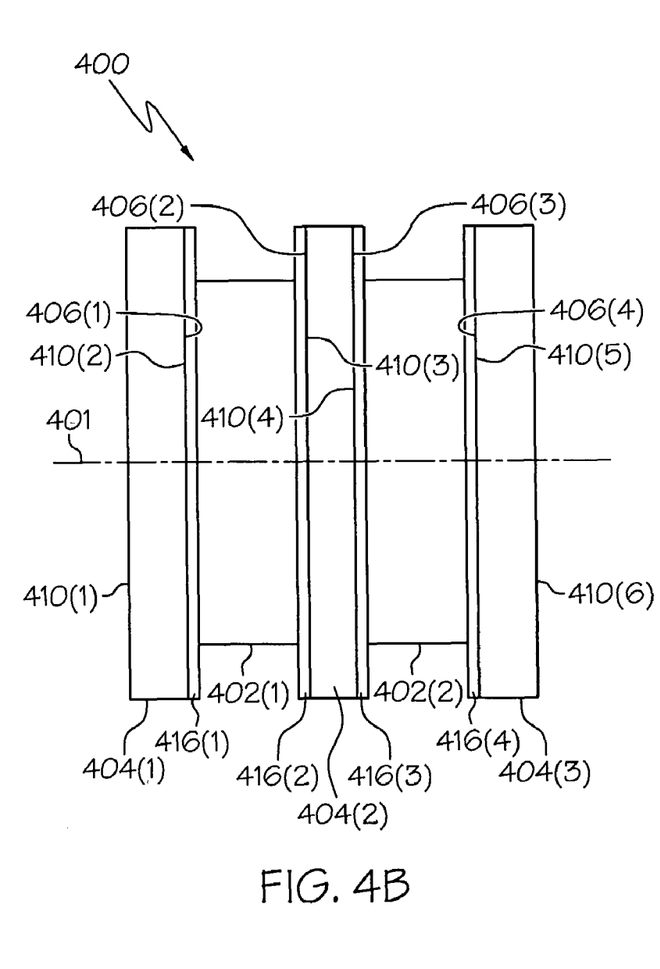

FIG. 4 includes FIG. 4A and FIG. 4B, which depict respective side cross-sectional views of a gain module 400 according to the present invention. The gain module 400 includes alternating gain media 402(1)-(2) that alternate with optically transparent heat conductors 404(1)-(3) in a stacked, or sandwich-like, configuration, as shown. The gain media 402(1)-(2) and heat conductors 404(1)-(3) are arranged on an optical axis 401, and the optical surfaces 410(1) and 410(6) are arranged to pass light along the optical axis 401. The optical axis may be associated with an optical resonator of suitable design (not shown). Each of the gain media 402(1)-(2) includes respective first and second optical surfaces 406(1)-(4) that are adjacent to corresponding optical surfaces 410(2)-(5) of the transparent heat conductors 404(1)-(3). Any suitable solid state gain material may be used for the gain media 402(1)-(2). For non-limiting example, the gain material may be any suitable solid state laser gain medium or suitable nonlinear gain medium.

FIG. 4A shows the gain module 400 in a lower-temperature state, e.g., room temperature, in which the first and second optical surfaces of the gain media are dissimilar to and substantially not in contact with touching the heat conductors 404(1)-(3). The optical surfaces of the gain media 402(1)-(2) are pre-formed into a desired shape, e.g., concave, to accommodate thermal expansion of the gain material at desired operational conditions. Index-matching layers 416(1)-(4) may optionally be present between adjacent gain media 402(1)-(2) and heat conductors 404(1)-(3) to facilitate optical power flow through the gain module 400 by minimizing Fresnel reflection losses. The refractive index of the index-matching material 416(1)-(4) may be selected as desired. In certain embodiments, refractive index of the index-matching material 416(1)-(4) may be equal or about equal to the geometric mean of the refractive indexes of the gain media 402(1)-(2) and the heat conductors 404(1)-(3).

FIG. 4B shows the gain module 400 of FIG. 4A in an operational condition than of the condition shown in FIG. 4A. The operational condition may correspond to a desired pumping load and/or specific output for the gain media 402(1)-(2). After undergoing thermal expansion, due to the designed pumping and gain process, the layers of gain media 402(1)-(2) conform to the proximal surface(s) of the transparent heat conductors 404(1)-(3). Conductive eat transfer occurs from the gain media 402(1)-(2) to the heat conductors 404(1)-(3), in the direction of the optical axis 401. The heat is then rapidly conducted radially outward, in a direction perpendicular to the optical axis 401, through the transparent heat conductors 404(1)-(3) to ancillary thermal management system components, e.g., a cooling fluid circulating at the circumference of the gain module 400. This geometry effectively removes the heat from the gain medium 402(1)-(2) in a manner that permits the attainment of high power output with high beam quality.

With continued reference to FIG. 4A, when starting from a condition of no pumping, the transition to a desired final shape of the gain media, i.e., one that conforms to the optical surfaces of adjacent heat conductors, is made faster by the initial poor physical contact between the gain media 402 (1)-(2) and the heat conductors 404(1)-(3). This poor initial physical contact, which is because of the gap separating the gain material 402(1)-(2) and the adjacent heat conductors 404(1)-(3), provides little opportunity for heat conduction from the gain media 402(1)-(2) to the heat conductors 404(1)-(3). The initial optical performance may be relatively poor at initial pumping conditions because of the gap that is present, which will lead to a larger fraction of pump power ending up as waste heat. This in turn may accelerate the transition to a desired final shape of the gain media 402 and level of optical performance. The number of transparent heat conductors may be selected as desired. For example, the number of heat conductors 404 may be selected based on the heat removal needs for a given volume of gain material, pumping loads, and desired specific output.

Figure 5:
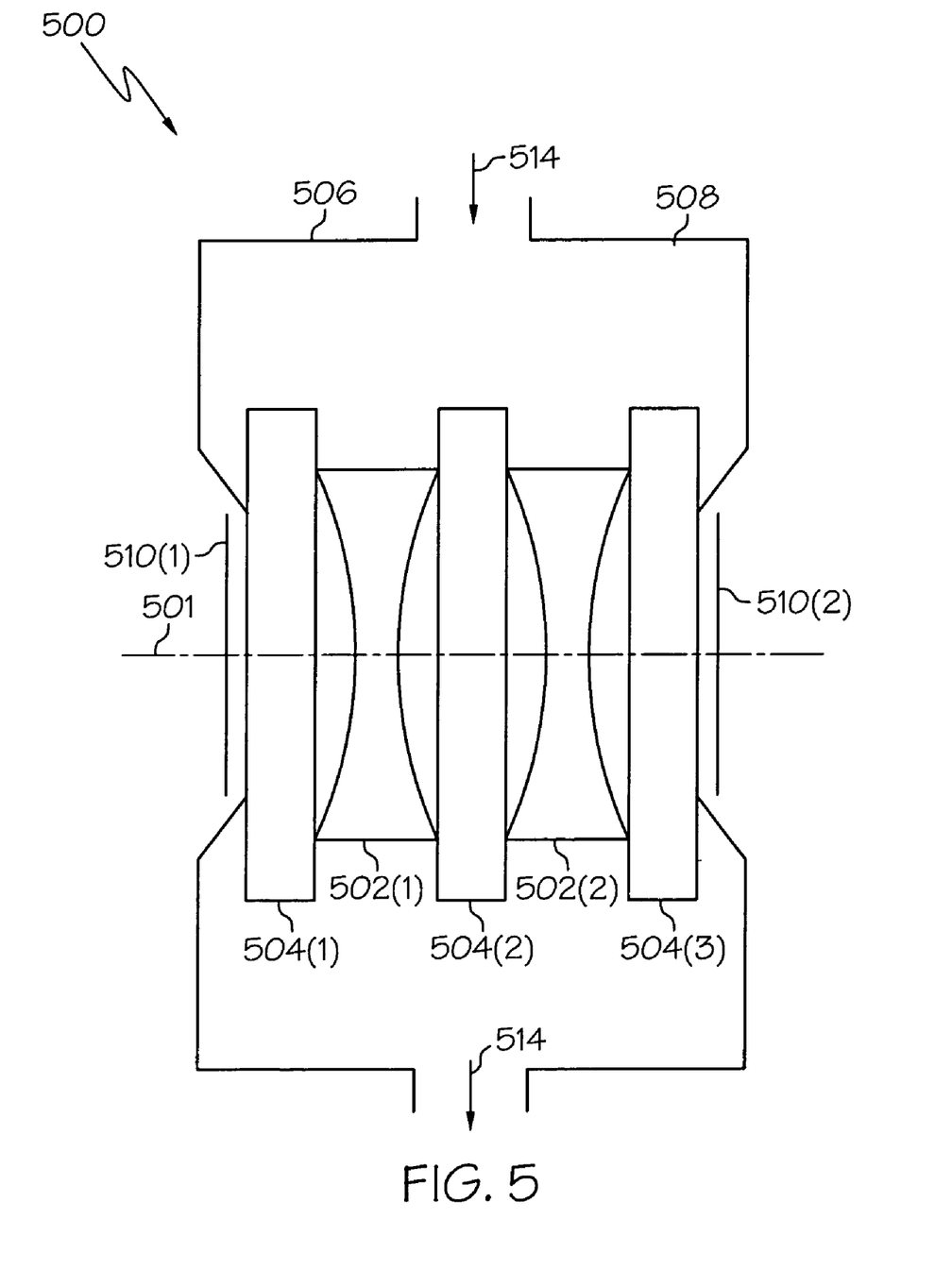
FIG. 5 is a side cross-sectional view of an alternate illustrative embodiment according to the present invention.

FIG. 5 shows a cross section of a gain module 500 according to an alternate embodiment of the present invention in which a manifold 506 is used in conjunction with a fluid 508 for heat removal. Gain media 502(1)-(2) with desired coupling surface profiles alternate with transparent heat conductors 504(1)-(3), as shown, similar to the embodiment of FIG. 4. The manifold 506 surrounds the lateral surfaces of the gain module 500. Windows, or recesses, 510(1)-(2) are present in the manifold 506 to allow optical pumping of the gain media 502(1)-(2) along the optical axis 501 and also to allow the optical output to exit the gain module 500. It will be understood that while one direction of fluid flow 514 is show, other configurations of the manifold 506 and fluid flow are possible.

Figure 6:
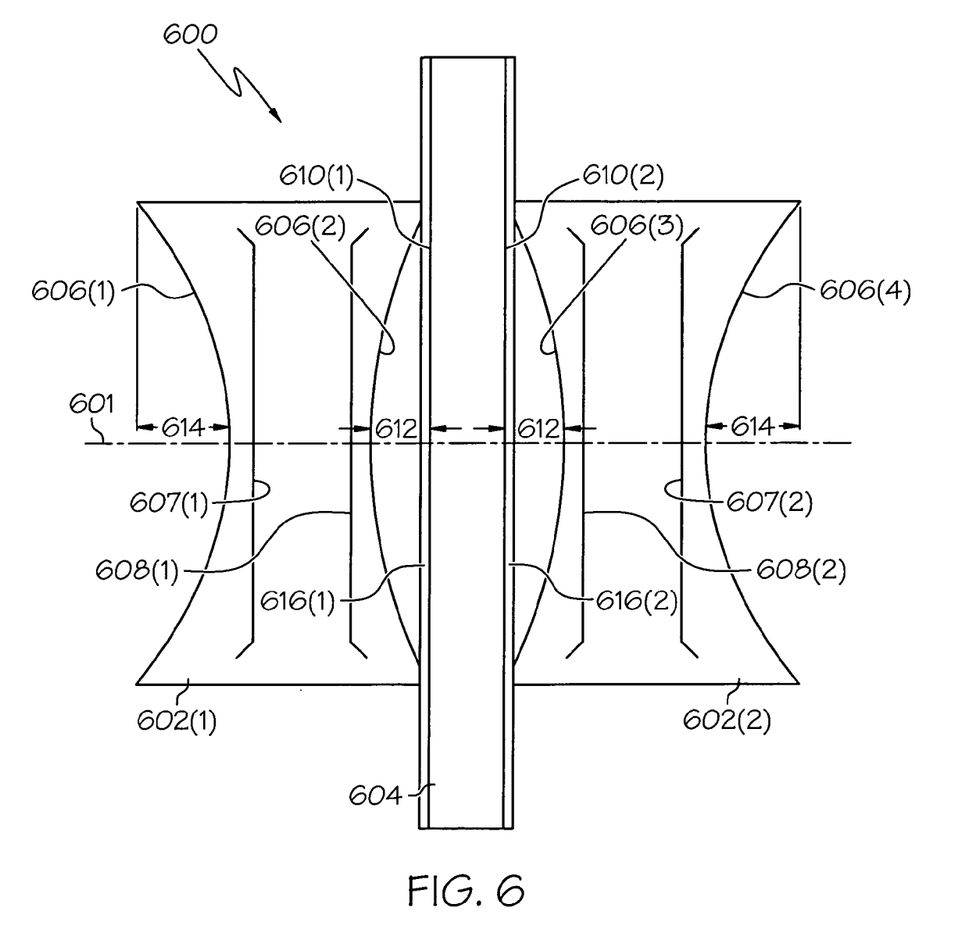
FIG. 6 is a side cross-sectional view of an alternate illustrative embodiment according to the present invention in which a transparent heat conductor is positioned between two portions of gain medium.

FIG. 6 shows another embodiment 600 of a gain module according the present invention. In this embodiment, two gain media 602(1)-(2) are shown positioned on either side of a transparent heat conductor 604 along an optical axis 601. Antireflection coatings 616(1)-(2) may optionally be present between the gain media 602(1)-(2) and the transparent heat conductor 604. Due to the different heat conduction properties on the optical surfaces 606(1)-(4) of the gain media 602(1)-(2), each optical surface of an individual gain medium experiences a different thermal expansion at a desired operational condition. The initial shapes, e.g., profiles 607(1)-(2) relative to the optical axis 601, of the respective optical surfaces 606(1)-(4) of the gain media are accordingly different in the embodiment shown. Profiles 607(1)-(2) that are not adjacent to a transparent heat conductor 604 may have a higher degree of concavity 614 than profiles 608(1)-(2) that are adjacent to the heat conductor 604 to accommodate increased thermal expansion.

Figure 7:
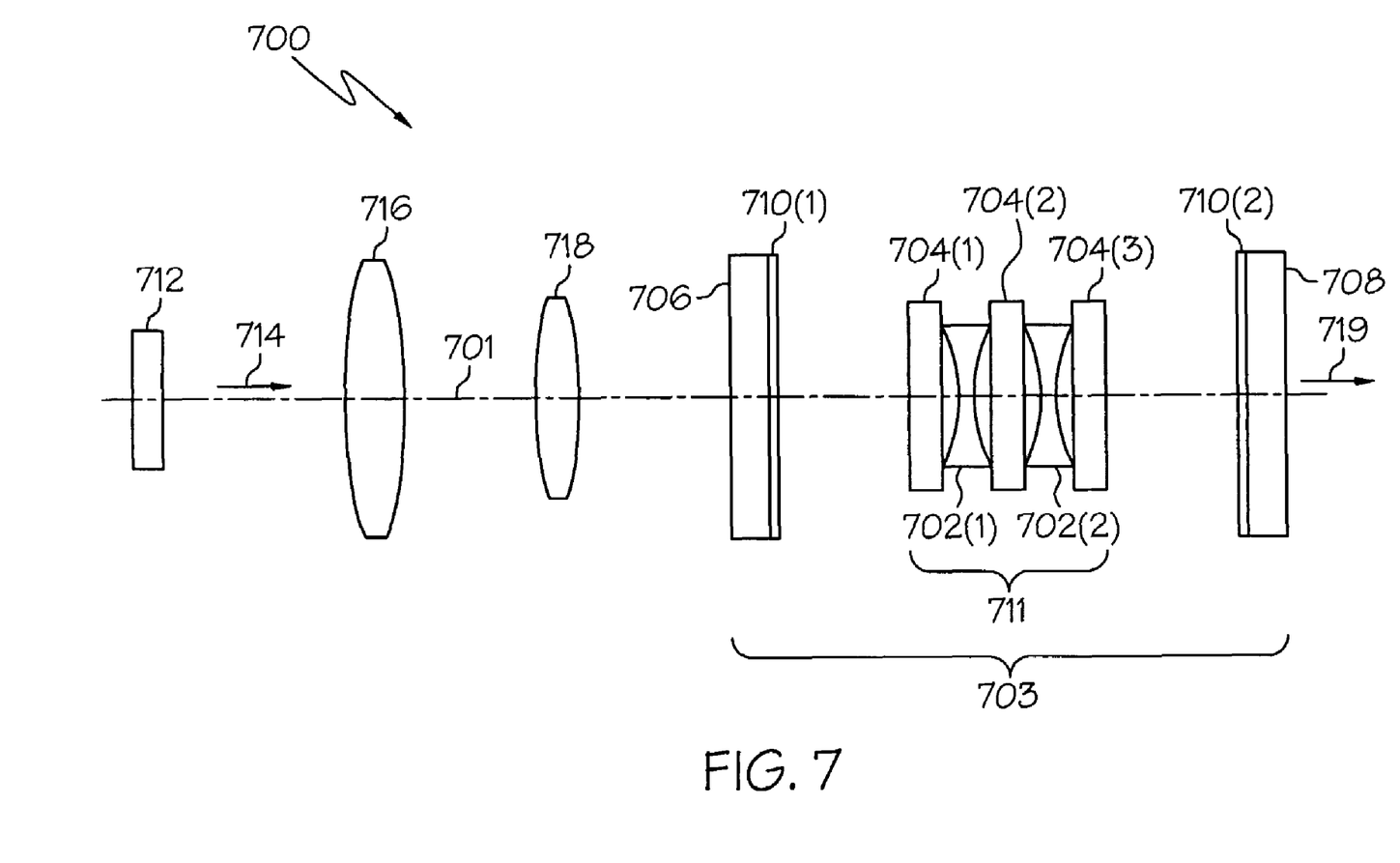
FIG. 7 is a side cross-sectional view of an illustrative embodiment of a resonator and gain system according to the present invention.

FIG. 7 is a side cross-sectional view of an embodiment of a resonator system 700 according to the present invention. The system 700 includes a gain module 711 with alternating layers of gain media 702(1)-(2) and transparent heat conductors 704(1)-(3), similar to the embodiment of FIG. 4. The gain module 711 is disposed between first and second mirrors 706, 708, forming a resonator 703 that is operable to produce an output 719. The gain module 711 is pumped by pump energy 714 from a means for pumping. The means for pumping may be any suitable light source 712, such as a diode array, a flash lamp, a suitable laser, etc. Collimating and/or imaging optics, such as lenses 716 and 718, may be present on the optical axis 701 to direct the pump energy to the gain layers 702(1)-(2). Even though the gain layers 702(1)-(2) are shown in FIG. 7 as not touching the transparent heat conductor 704(1)-(3), it will be understood that once certain operation conditions are met, the gain media 702(1)-(2) will contact the heat conductors 704(1)-(3), e.g., similar to the configuration shown in FIG. 3B. Dichroic coatings 710(1)-(2) may be present on the first and second mirrors 706, 708 to allow unwanted pump energy to exit the resonator 703 while maintaining desired reflectivities for the amplified light energy. The presence of dichroic coatings 710(1)-(2) can consequently decrease the potential for material damage to the mirrors 706, 708.

Figure 8:
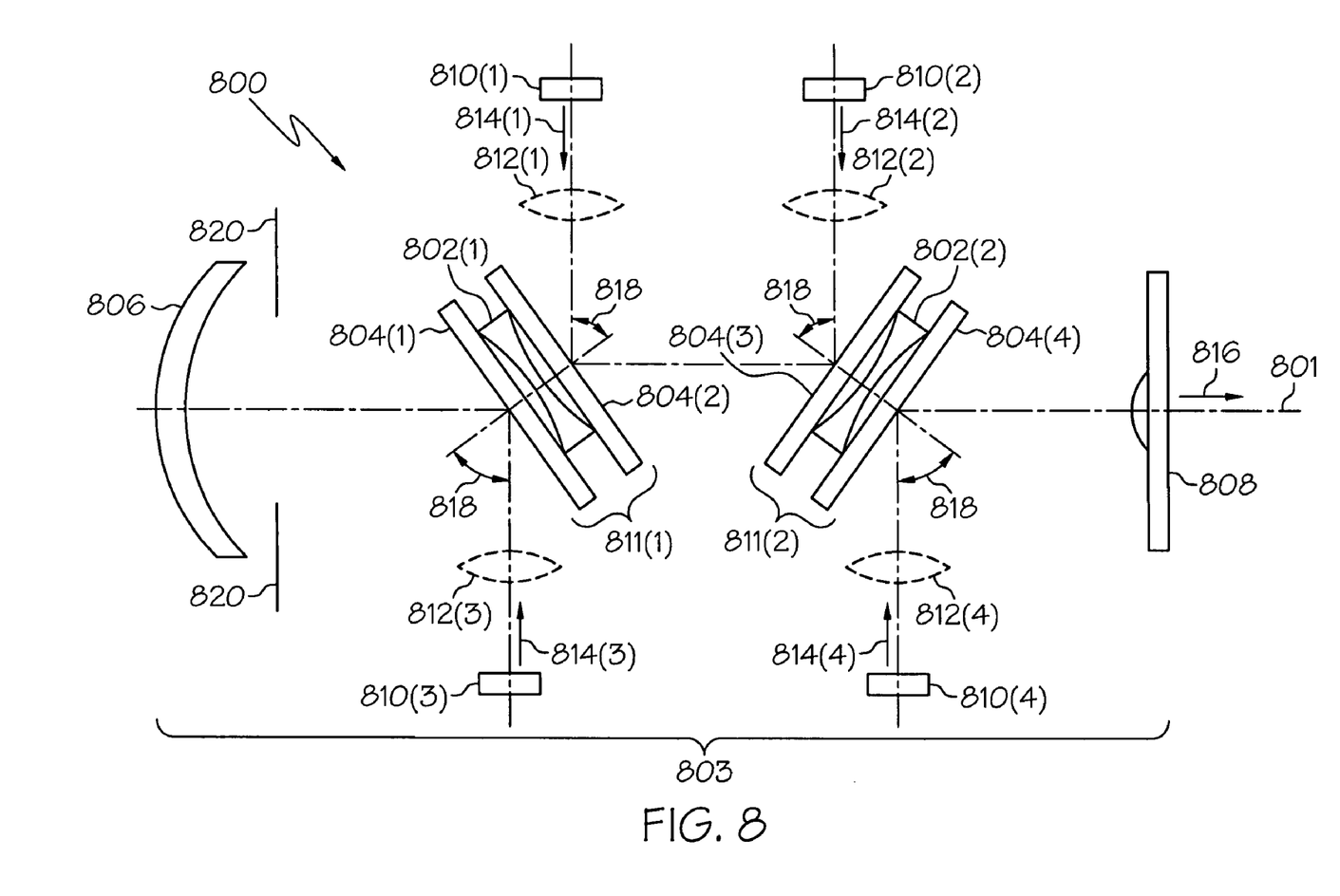
FIG. 8 is a side cross-sectional view of an illustrative resonator system having an unstable resonator and pump arrays in a Brewster angle configuration.

FIG. 8 is a side cross-sectional view of a resonator and thermal management system 800 having gain modules 811(1)-(2) and first and second mirrors 806, 808. The first and second mirrors 806, 808 are configured to operate as resonator 803 having an optical axis 801. The gain modules 811(1)-(2) are located on the optical axis 801. Similar to previously described embodiments, the gain modules 811(1)-(2) include gain media 802(1)-(2) placed between transparent heat conductors 804(1)-(4). The system 800 includes pump arrays 810(1)-(4) configured in a Brewster angle configuration for the transparent heat conductor material, e.g., diamond, and an intermediary optical medium, e.g., air.

The Brewster angle 818 for a given pair of optical materials, or media, is equal to the arctangent of the refractive index of the first optical material, or medium, divided by the refractive index of the second optical material, or medium. At the Brewster angle, one polarization of light is completely transmitted through the boundary of the two optical materials or media, with no power losses for that polarization due to Fresnel reflection, i.e., no losses occur due to the difference in refractive index. In the Brewster angle configuration the pump arrays direct optical pump energy 814(1)-(4) to the gain cells 811(1)-(2) at an incidence angle equal to the Brewster angle 818 of the heat conductors and an intermediary optical medium. Such Brewster angle configurations may be desirable in certain embodiments because no pump energy is directed along the optical axis 801, doing away with any need for dichroic coatings (such as are depicted in FIG. 7) on the end mirrors 806, 808. Collimating and/or imaging optics 812(1)-(4) may optionally be present to facilitate directing the pump energy 814(1)-(4) to the gain modules 811(1)-(2).

With continuing reference to FIG. 8, resonator 803 is depicted as an unstable resonator. So-called "unstable" resonators are referenced as such because of the instability of the resonant modes within such resonators. A stable resonator is one in which a light ray inside the resonator will remain close to the optical axis upon multiple reflections between the end mirrors of the resonator and thus remain confined within the resonator; the modes of a such a resonator are stable. An unstable resonator is one in which a light ray inside the resonator does not remain confined within the resonator after multiple reflections between the end mirrors. For unstable resonators, the typical optical mode profile, which is unable to be expressed explicitly by Gaussian/Gaussian-Hermite polynomials, depends upon the geometry and mirror configuration of the resonator cavity. Optical resonators can be classified according to a condition known as "stability". Unstable resonators are characterized by an inherent telescopic magnification or magnification factor, M. The cross-sectional size of optical modes formed in unstable resonators continually grows by a factor, e.g., $M^2$, on each roundtrip through the resonator. Because the optical modes expand in an unstable resonator, more of a given volume of gain material can be utilized for the associated optical gain process. Unstable resonators may consequently be well suited for high power lasers and/or parametric devices.

The stability condition of a simple two mirrors standing wave resonator can be determined by reference to the well known stability criterion, $0 \leq [1+(d/R_1)][1+(d/R_2)] \leq 1$; where d is the length of the optical axis within the resonator, and $R_1$ and $R_2$ each represent a radius of curvature for the respective resonator mirrors. The bracketed values in the stability criterion are often referred to as the resonator stability parameters. The stability criterion is often represented graphically as a hyperbola when the respective stability parameters are selected the values for the coordinate axes. Resonator geometries corresponding to points within the region bounded by the hyperbola and the coordinate axes are stable resonator geometries while those outside of the bounded region are unstable. Where the product of stability parameters is a positive value, an unstable resonator is said to be a "positive-branch" unstable resonator. Similarly, where the product of stability parameters is a negative value, an unstable resonator is said to be a "negative-branch" unstable resonator.

For embodiments of the present invention, any suitable unstable resonator design may be used, e.g., a positive-branch or negative-branch unstable resonator. The unstable resonator 808 may be a confocal unstable resonator in certain embodiments. Suitable confocal unstable resonator designs include confocal-planar and confocal-convex types. In certain embodiments, the mirrors used in the unstable resonator as output couplers, e.g., mirror 808, may include one or more optical coatings having a graded reflectivity profile, in which case the mirrors may be referred to as graded-reflectivity mirrors (GRM). A GRM may allow single transverse mode (STM) oscillation at a beam diameter substantially greater than the typical $TEM_{00}$ mode size to avoid optical damage to the components in the resonator. Such graded reflectivity profiles for a GRM may include, by way of non-limiting example, a substantially Gaussian or super-Gaussian profile, to improve the characteristics of the output beam. Suitable GRM may include a high reflectivity central region known as a dot reflector. In certain applications, a GRM may include an apodizing, or smoothing, element to limit the output beam diameter.

Figure 9:
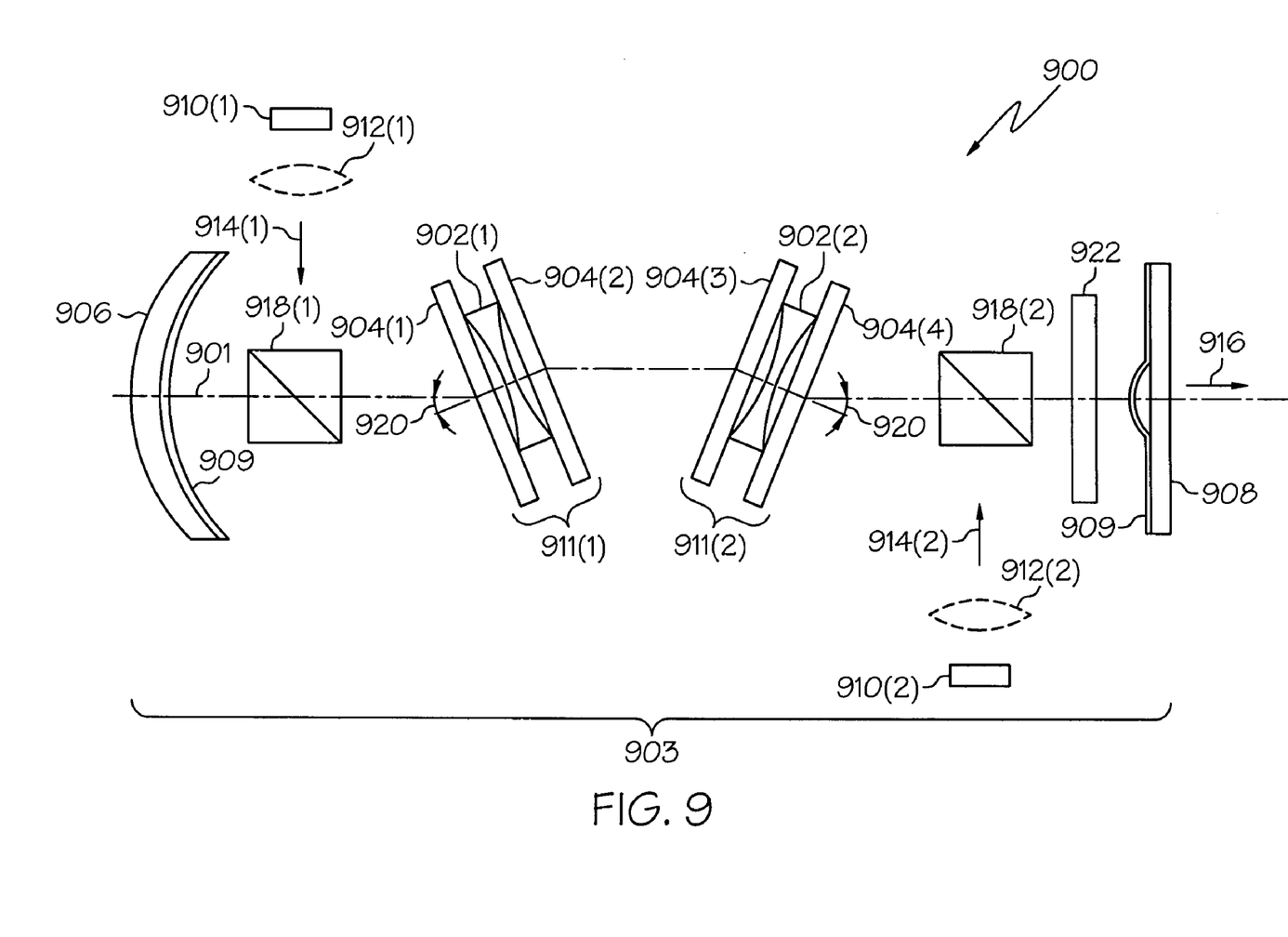
FIG. 9 is a side cross-sectional view of an alternate illustrative embodiment of a resonator system having an unstable resonator configuration.

FIG. 9 is a side cross-sectional view of an alternate embodiment of a resonator and thermal management system 900 having an unstable resonator configuration similar to FIG. 8. The system 900 includes gain modules 911(1)-(2) and beam combiners 918(1)-(2) located on an optical axis 901 within an unstable resonator 903 formed by first and second mirrors 906, 908. The gain modules 911(1)-(2) include gain media 902(1)-(2) disposed between transparent heat conductors 904(1)-(4). The beam combiners 918(1)-(2) are configured and arranged to direct optical pump energy 914(1)-(4) from pump light sources 910(1)-(4) to the gain modules 911(1)-(2). The gain modules 911(1)-(2) are configured and arranged within the resonator 903 such that light received from the beam combiners 918(1)-(2) is incident at the Brewster angle 920 for the heat conductors and an intermediary optical medium, e.g., air.

The beam combiners 918(1)-(2) of FIG. 9 may be Brewster beam combiners, e.g., pairs of Brewster prisms in certain applications. The pump light sources 910(1)-(4) are not necessarily orthogonal to the optical axis 901. Collimating and/or focusing optics 912(1)-(4) may be present as shown to facilitate pumping of the gain modules 911(1)-(2). Dichroic coatings 909 may be present on the first and second mirrors 906, 908 to allow the mirrors to transmit unwanted pump energy while maintaining desired reflectivities for the amplified light energy, thus decreasing material damage potential for the mirrors 906, 908, similar to the embodiment of FIG. 7.

FIG. 9 also includes an optical shutter 922 placed on the optical axis within the resonator 903. The optical shutter allows the system 900 to operate in quasi-CW or pulsed manner. Any suitable techniques or means may be used to produce quasi-CW or pulsed operation. For example, Q-switching or cavity dumping may be used to spoil the resonator cavity and prevent oscillation except for a very brief time during an operational cycle. In certain embodiments, one or more accousto-optical modulators may be used for Q-switching. There are various other suitable methods for Q-switching. For example, one of the resonator mirrors, e.g., 906, may be rotated at a desired rate about an axis perpendicular to the optical axis of the laser cavity. An electro-optic shutter, such as a Pockels cell, may be used as the optical shutter 922. A saturable absorber, typically a certain type of dye that bleaches out or becomes transparent when strongly irradiated so that the upper levels are saturated and thus no more absorption can occur, may be used for Q-switching in certain embodiments.

Figure 10:
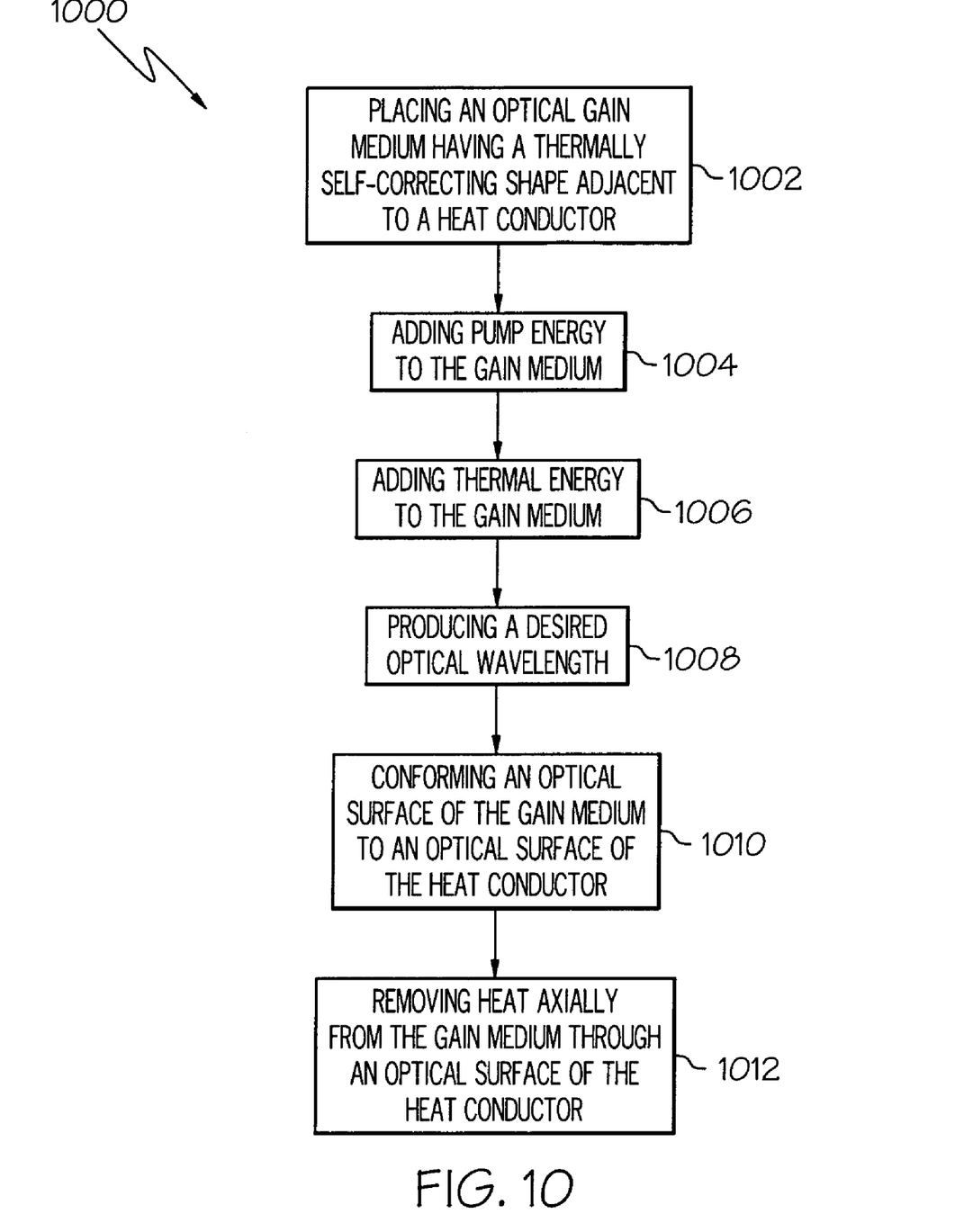
FIG. 10 depicts steps in an illustrative method of producing light using a self-correcting gain medium according to the present invention.

FIG. 10 shows steps in a method 1000 of producing light using a self-correcting gain medium in conjunction with a transparent heat conductor. An optical gain medium having first and second optical surfaces, where the first optical surface has a thermally self-correcting shape, may be placed 1002 adjacent a heat conductor having first and second optical surfaces. The heat conductor is transparent at one or more desired optical wavelengths. The thermally self-correcting shape is dissimilar to the shape of the first optical surface of the heat conductor at an initial level of optical output of the gain medium. Pump energy is added 1004 to the gain medium. Thermal energy is added 1006 to the gain medium by an optical gain process. A desired optical wavelength is produced 1008 by the gain medium at a desired specific output. The first optical surface of the gain medium conforms 1010 to the first optical surface of the heat conductor at a desired optical output condition of the gain medium, e.g., a specific output level. Heat is removed 1012 axially from the gain medium through the first optical surface of the heat conductor. Heat is then removed radially from the heat conductor. The step of adding thermal energy 1004 to the gain medium may occur during a gain process including laser amplification of fluorescence or parametric amplification of a signal, idler or pump wave.

Accordingly, embodiments of the present invention may offer advantages over the prior art. Modeling calculations and preliminary research data have shown that embodiments may be well suited to repetitively pulsed and CW lasers with high specific output powers, e.g., greater than or equal to 2 kW/cc from active materials such as Nd:YAG. Embodiments may be used to efficiently remove heat from solid state gain media, including laser and parametric gain media, to allow high power operation of the gain media. Anti-reflection coatings may be used to minimize optical transmission loss in order to maximize the efficiency of the associated gain medium/media. Embodiments may also provide for improved beam quality at desired power outputs without requiring the use of fixed optics. Embodiments offer design flexibility and the geometry of any resonator used can vary greatly within the scope of the present invention. For example, both stable and unstable resonator geometries and architectures can be used. Resonator according to the present invention may be used in master oscillator and/or power amplifier architectures. Embodiments may also include rings resonator configurations.

By non-limiting example, embodiments of the present invention may be used in material modification and/or fabrication applications. Certain embodiments may be used in highly-miniaturized, high brightness, fieldable systems for ground, airborne, and space-based applications. Embodiments may be applied to or used in a wide variety of CW and pulsed solid-state laser architectures and may be used for laser illuminators and beacons, ladars/lidars, and countermeasure transmitters as well as directed energy weapons systems. Certain embodiments may be used for parametric devices, including optical parametric generators and optical parametric oscillators.

Examples of suitable solid state laser gain media include, but are not limited to, chromium-doped colquiriite crystals including lithium strontium aluminum fluoride (LiSAF), lithium strontium gallium fluoride (LiSGaF), and lithium calcium aluminum fluoride (LiCAF) and cerium-doped lithium strontium aluminum fluoride (Ce:LiSAF). Yttrium aluminum garnet (YAG) or yttrium lithium fluoride (YLF) doped with trivalent laser activator ions from both the Rare Earth and Transition Metal groups, e.g., neodymium (Nd), chromium (Cr), erbium (Er), holmium (Ho), thullium (Tm), and ytterbium (Yb), may be used as gain media in certain other embodiments.

In certain embodiments, suitable nonlinear crystals used as a parametric gain medium may include, but are not limited to, crystals of ammonium diphosphate ($NH_4H_2PO_4$ or "ADP"), beta ($\beta$) barium borate (BBO), gallium selenide (GaSe), barium lithium niobate ($Ba_2LiNb_5O_{15}$), cadmium gallium sulfide ($CdGa_2S_4$), cadmium selenide (CdSe), cadmium germanium diarsenide ($CdGeAs_2$), lithium niobate ($LiNbO_3$), lithium tantalate ($LiTaO_3$), lithium triborate ($LiB_3O_5$ or "LBO"), potassium diphosphate ($KH_2PO_4$ or "KDP"), potassium titanyl phosphate ($KTiOPO_4$ or "KTP"), and potassium titanyl arsenate ($KTiOAsO_4$ or "KTA"). Such media may be of either Type I or Type II nonlinear crystals.

Although certain embodiments of the present invention have been described, other versions are possible. For example, while certain embodiments have been described as including transparent heat conductors made from diamond, other materials may be used for the transparent heat conductor. For example, sapphire may be used in certain embodiments. Other suitable materials may be used. Furthermore, while shapes of heat conductors described above have been described generally as disks of single crystal diamond, other shapes and configurations may be employed. For example, suitable transparent heat conductors may be configured as a mosaic of multiple pieces of transparent heat conductors that fit together in the desired shape for a desired beam size. For example, multiple disks of single crystal diamond may be arranged in a circular mosaic to accommodate a desired beam size. For further example, while the optical surfaces of gain media have been described as conforming to a planar surface of a heat conductor at desired output conditions, the optical surfaces of the gain media may be designed to conform to any desired shape at the desired output conditions. Additionally, while means for pumping have been described as supplying optical energy to a gain medium, suitable means for pumping may supply other types of pump energy in certain embodiments. For nonlimiting example, electrical pumping may be used for certain applications.

While the present invention has been particularly shown and described with references to preferred embodiments thereof, it will be understood by those skilled in the art that various changes in form and details may be made therein without departing from the spirit and scope of the invention as defined by the appended claims. All the features disclosed in this specification, including any accompanying claims, abstract, and drawings, may be replaced by alternative features serving the same, equivalent or similar purpose, unless expressly stated otherwise.

What is claimed is:

1. A thermally self-correcting optical gain module comprising:
   a first heat conductor substantially transparent to one or more desired wavelengths of light, said first heat conductor having a first coefficient of thermal expansion, a first coefficient or thermal conductivity, and first and second optical surfaces;
   a first gain medium operable to produce light at one or more desired wavelength and having first and second optical surfaces, said first gain medium disposed adjacent to said first heat conductor, said first gain medium having a second coefficient of thermal expansion greater than said first coefficient of thermal expansion, said first gain medium having a second coefficient of thermal conductivity lesser than said first coefficient of thermal conductivity, wherein said first gain medium is operable to receive pump energy from a means for pumping, wherein said first optical surface of said first gain medium has a predetermined shape at a first optical output condition, wherein said first optical surface of said first gain medium is substantially dissimilar to said first optical surface of said first heat conductor at said first optical output condition, and wherein said first optical surface of said first gain medium substantially conforms to and contacts said first optical surface of said first heat conductor at a second optical output condition, wherein heat conduction can occur from said first gain medium to said first heat conductor through an interface formed by said first optical surface of said first heat conductor and said first optical surface of said first gain medium at said second pumping condition;
   wherein said first optical surface of said first gain medium is concave toward said first optical surface of said first heat conductor; and
   wherein said first optical surface of said first gain medium has a substantially Gaussian or Hermite-Gaussian profile relative to said optical axis.

2. The gain module of the claim 1, wherein said gain medium comprises a laser gain material.

3. The gain module of claim 2, wherein said gain medium comprises YAG.

4. The gain module of claim 3, wherein said gain material comprises Nd:YAG.

5. The gain module of claim 1, wherein said gain medium comprises a nonlinear gain medium.

6. The gain module of claim 5, wherein said nonlinear gain medium comprises KTA.

7. The gain module of claim 1, wherein said first optical surface of said first heat conductor is substantially circular.

8. The gain module of claim 1, wherein said first gain medium is shaped as a disk.

9. The gain module of claim 1, wherein said first optical surface has a Gaussian profile relative to said optical axis.

10. The gain module of claim 8, wherein said first transparent heat conductor is shaped as a disk, said disk being axisymmetric with said optical axis.

11. The gain module of claim 1, wherein said first transparent heat conductor comprises diamond.

12. The gain module of claim 11, wherein said diamond is single crystal diamond.

13. The gain module of claim 1, wherein said first transparent heat conductor comprises sapphire.

14. The gain module of claim 1, further comprising one or more anti-reflective or index matching coatings disposed between said first optical surface of said first gain medium and said first optical surface of said first heat conductor, wherein said one or more anti-reflective or index matching coatings have refractive indexes between a refractive index of said first gain medium and said first heat conductor.

15. The gain module of claim 14, wherein said one or more coatings comprise coatings selected from the group consisting of Al2O3, Ta2O5, MgFl2, SiO2, TiO, and combinations thereof.

16. An optical gain module comprising:
   a heat conductor substantially transparent to one or more desired wavelengths of light; and
   a gain medium operable to produce light at one or more desired wavelength, the gain medium disposed adjacent to the heat conductor and having an optical surface opposing the heat conductor, the gain medium being configurable, in response to receiving pump energy from a pump energy source, between (i) a first position where the optical surface opposing the heat conductor defines a cavity relative to the heat conductor and (ii)

a second position where the optical surface opposing the heat conductor substantially conforms to an optical surface of the heat conductor;

wherein, in the first position, the optical surface of the first pain medium defines a concave cavity relative to the optical surface of the heat conductor;

wherein, in the first position, the optical surface of the pain medium defines a substantially Gaussian profile relative to an optical axis of the gain medium.

17. An optical gain module comprising:

a heat conductor substantially transparent to one or more desired wavelengths of light; and a gain medium operable to produce light at one or more desired wavelength, the gain medium disposed adjacent to the heat conductor and having an optical surface opposing the heat conductor, the gain medium being configurable, in response to receiving pump energy from a pump energy source, between (i) a first position where the optical surface opposing the heat conductor defines a cavity relative to the heat conductor and (ii) a second position where the optical surface opposing the heat conductor substantially conforms to an optical surface of the heat conductor;

wherein, in the first position, the optical surface of the first gain medium defines a concave cavity relative to the optical surface of the heat conductor;

wherein, in the first position, the optical surface of the gain medium defines a substantially Hermite-Gaussian profile relative to an optical axis of the gain medium.

* * * * *